United States Patent [19]

Devine et al.

[11] Patent Number: 4,978,449
[45] Date of Patent: Dec. 18, 1990

[54] WATER PURIFIER WITH AIR-PASSING RETAINER ABOVE WATER INLET

[76] Inventors: Frank M. Devine; Rod D. Shapiro, both of 1933 S. Broadway, L.A. Mart, Ste. 300, Los Angeles, Calif. 90007

[21] Appl. No.: 478,542

[22] Filed: Feb. 12, 1990

[51] Int. Cl.$^5$ ............................................. B01D 15/00
[52] U.S. Cl. .................................... 210/264; 210/266; 210/282; 210/290; 210/472
[58] Field of Search ............... 210/264, 290, 266, 282, 210/291, 472, 283, 284

[56] References Cited

U.S. PATENT DOCUMENTS

| | | | |
|---|---|---|---|
| 4,298,475 | 11/1981 | Gartner | 210/282 |
| 4,749,484 | 6/1988 | Greenhut | 210/266 |
| 4,826,594 | 5/1989 | Sedman | 210/290 |
| 4,851,122 | 7/1989 | Stanley | 210/290 |
| 4,894,154 | 1/1990 | Roz et al. | 210/290 |
| 4,913,808 | 4/1990 | Haque | 210/290 |

*Primary Examiner*—Richard V. Fisher
*Assistant Examiner*—Cynthia L. Nessler

*Attorney, Agent, or Firm*—Arthur Freilich; Robert D. Hornbaker; Leon D. Rosen

[57] ABSTRACT

A home water purifier is described, which includes a column of beads of ion exchange material and a column of grains of activated charcoal, which is of low cost construction. The filter includes a housing (26, FIG. 2) with a vertically-extending chamber having an air outlet at the top, a water inlet (46) at the middle, and a water outlet at the bottom. A mass (60) of activated charcoal grains lies in the lower portion of the chamber to remove impurities, and a mass (56) of ion exchange beads lies above the charcoal but below the water inlet to remove heavy metals. An air passage (64) formed along the upper portion of the chamber holds a retainer (66) of open cell foam material that prevents loss of the filtering material if the filter is turned upside-down during transport. The space (70) between the bottom of the retainer and the top of the ion exchange beads is less than the mass of the ion exchange beads, so if the water filter is turned over during transport, the charcoal grains and ion exchange beads will not mix. The housing of the filter forms a downwardly-facing ledge (71) at the top of the ion exchange material, to further avoid mixing during transport.

4 Claims, 1 Drawing Sheet

WATER PURIFIER WITH AIR-PASSING RETAINER ABOVE WATER INLET

BACKGROUND OF THE INVENTION

One type of home water purifier, shown in U.S. Pat. 4,749,484, includes upper and lower vessels, and a vertical water filter with a water inlet for receiving water from the upper vessel, a column of activated charcoal grains through which the water passes, and a water outlet at the bottom for delivering water to the lower vessel. The filter includes an air passage that extends to the top of the upper vessel to discharge air thereto which is separated from the aerated water as it flows through the activated charcoal. Further filtering can be achieved by including a column of ion exchange beads which remove heavy metals from the water before the water reaches the activated charcoal.

Typical ion exchange material has the consistency of wet sand, in that it has a moderately low cohesiveness. Activated charcoal is initially in a form of dry grains. The grains should be very fine in a home water filter, to avoid large gaps between grains that would allow water to pass therethrough without contacting the surface of the activated charcoal. It is important that large amounts of the ion exchange beads not mix with the fine charcoal grains, or else considerable water could pass along the ion exchange beads without encountering the activated charcoal, and impurities such as bacteria could pass through. One way to prevent commingling despite the filter being turned on its side or even upside down during transport, is to provide a barrier between the masses of activated charcoal and of ion exchange material. Such a barrier would have to prevent movement of charcoal grains therethrough while allowing water to move therethrough. However, the cost of such a barrier and the additional effort to emplace it, adds to the cost of the water filter. Since the water filter is a replaceable item, minimizing the cost of each filter reduces the overall cost to the consumer.

SUMMARY OF THE INVENTION

In accordance with one embodiment of the present invention, a water purifier is provided which includes a water filter containing both ion exchange material and activated charcoal material, which minimizes mixing of the two types of materials in a filter of low cost. The filter includes a housing with an elongated vertically-extending chamber having a lower end with a water outlet, an upper end with an air outlet, and a middle part with a water inlet. A mass of activated charcoal grains lies in a lower portion of the chamber, and a mass of ion exchange material lies in the chamber above the charcoal grains, but generally below the water inlet. An air-passing retainer lies in the chamber above the ion exchange material, but below the air outlet. The ion exchange material lies directly on the mass of activated charcoal grains, without a sheet of barrier material between them. The retainer is spaced above the ion exchange material, to leave an air volume between them which is less than the volume of the mass of ion exchange material. As a result, if the chamber is turned upside down during transport, the mass of ion exchange material will sink but the grains will remain in a generally cohesive mass to avoid appreciable mixing of the charcoal grains with the beads of the ion exchange material.

The retainer is formed from a block of resilient open cell foam material which is held in place by friction resulting from compression of the block when it is inserted into the air passage of the chamber. The housing which forms the chamber, forms a downwardly-facing ledge lying approximately at the periphery of the top of the mass of ion exchange material, to minimize downward movement of the ion exchange material when the chamber is turned upside down.

Although particular embodiments of the invention have been described and illustrated herein, it is recognized that modifications and variations may readily occur to those skilled in the art, and consequently, it is intended that the claims be interpreted to cover such modifications and equivalents.

DESCRIPTION OF THE PREFERRED EMBODIMENT

Figure 1:
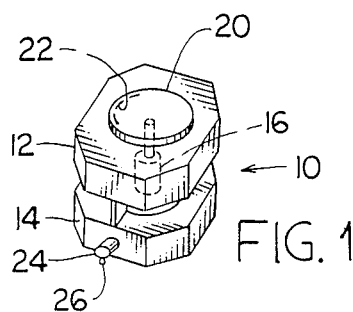
FIG. 1 is a perspective view of a water purifier with a water filter therein constructed in accordance with the present invention.

FIG. 1 illustrates a water purifier 10 which includes upper and lower vessels 12, 14 and a water filter 16 extending between them. A cap 20 on the upper vessel can be removed and water poured into the upper vessel through an opening 22. Water flows through the filter 16 where impurities are removed, and into the lower vessel 14. A valve 24 on the lower vessel can be operated to allow water to flow out of an outlet 26, as into a cup for drinking.

Figure 2:
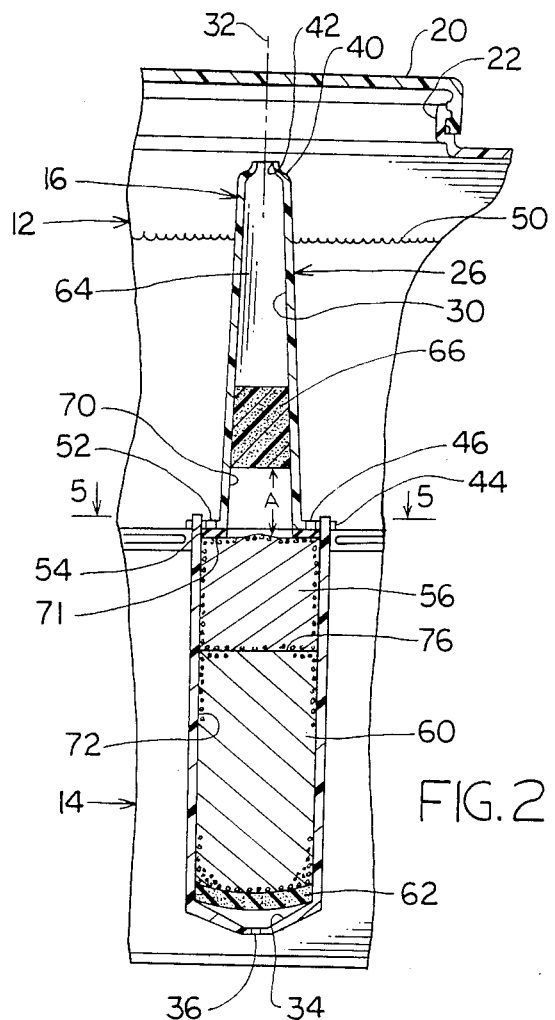
FIG. 2 is a partial sectional side view of the water purifier of FIG. 1 showing details of the water filter thereof.

As shown in FIG. 2, the water filter 16 includes a housing 26 having an elongated chamber 30 with a generally vertically-extending axis 32. The chamber has a lower end 34 with a water outlet 36, an upper end 40 with an air outlet 42, and a middle part 44 with a water inlet 46. In use, water is poured into the upper vessel 12, as to the level 50. The water passes through openings 52 at the water inlet and through a preliminary filter 54 that keeps out large particles. The water flows down through a mass 56 of ion exchange material in the form of multiple beads, and through a mass 60 of activated charcoal grains. The water then flows through an outlet filter 62 that allows only a slow flow of water therethrough, and through the water outlet 36 into the lower vessel 14. The water filter 16 is a replaceable unit, which must be replaced after a certain quantity of water has passed through it, which may result in a large portion of the ion exchange material 56 having been loaded with heavy metals, or a large portion of the activated charcoal 60 having been covered with contaminants that it absorbed from the water. Also, the filter should be replaced after a certain period of time, to avoid excessive growth of bacteria in the filter (which can feed on contaminants absorbed from the water). In a particular filter that applicant has constructed, applicant recommends that when the water purifier is used to filter tap water, that it be replaced after 100 gallons have passed through it or 60 days after it was first used.

When water is first poured into the upper vessel 12, and it flows through the water inlet 46 through the filtering masses 56 and 60, air in the water is released, especially as it encounters the activated charcoal grains at 60. The air passes up through an air passage 64 of the chamber which carries it to the air outlet 42 that lies above the level of water. An air-passing retainer 66 lies along the air passage, and is used to prevent loss of the filtering materials 56 and 60 during transport of the filter. During such transport and handling, the filter may be repeatedly turned upside down, which could cause the beads in the mass 56 and the grains in the mass 60 to fall out through the air inlet 42. The small cells of the retainer 66 prevent loss of filter material if the water filter is turned upside-down, while allowing air to pass through during use of the filter in an upright position.

It might be thought that the retainer 66 should be placed against the top of the mass 56 of ion exchange beads. However, it is found that an empty or open air space must be present above the level of the water inlet at 46, in order to allow the upward flow of air to start and then to continued as more water flows down through the activated charcoal and additional air is released. Without such an open air space, formed by a lower air passage portion 70, the first amount of air released from the water flowing into the filter, creates an air pressure that prevents further flow of water through the filter. Accordingly, the applicant places the air-passing retainer 66 so it is spaced a distance A above the water inlet, and is spaced above the mass 56 of ion exchange material.

Figure 3:
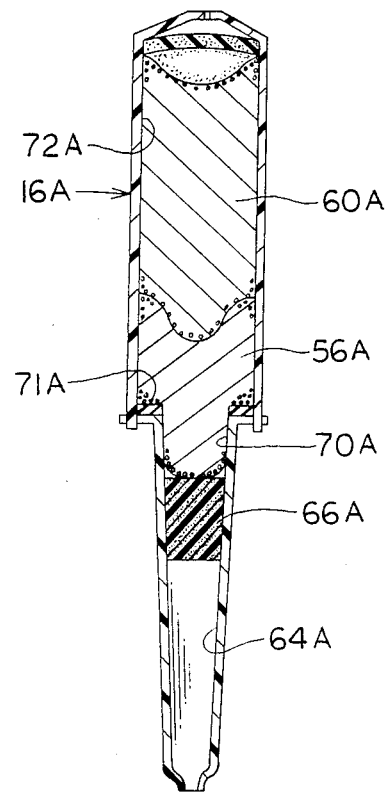
FIG. 3 is a view of the water filter of FIG. 2, shown in an upside-down orientation.

FIG. 3 shows the filter at 16A in an upside-down orientation, which it is likely to attain during transport. That is, a replacement filter is likely to be turned upside-down during handling, in as much as it is expensive and inconvenient to have to protect the device against turning it upside down. When the filter is upside-down, the masses at 56A and 60A both tend to fall down. The mass 56A of ion exchange beads has a low but appreciable cohesion, so it tends to remain as a continuous mass if only moderately deformed so that no parts have to slide relative to each other. Applicant places the retainer 66A close enough to the top of the ion exchange mass 56A, so the lower air passage portion 70A has only a moderate volume. The volume of the lower air passage portion 70 (when the retainer is spaced a distance A from the top of the ion exchange mass) is less than the volume of the mass 56. As a result, the mass at 56A tends to deform but remains a single continuous mass. This resists mixing of the charcoal grains of the mass 60A with the beads of the mass 56A, which would reduce the filtering capability of the activated charcoal mass by allowing unfiltered water to flow down around the ion exchange beads without coming into contact with the activated charcoal grains.

The preliminary filter 54 has a lower surface 71 that forms a downwardly-facing annular ledge that supports the peripheral portion of the mass 56A when turned upside-down. Also, the width of the air passage at 70A is less than that of the lower chamber portion. As a result, the radially outer portions of the ion exchange mass 56A tends to remain in place and only the middle of the mass tend to droop into the lower air passage portion 70A, thereby avoiding complete separation of the middle of the mass 56A with respect to the periphery of the mass 56A if it sticks to the walls of the chamber. Thus, by providing only a small volume in the space 70A and by providing the ledge at 71A, applicant keeps the mass of ion exchange material in a cohesive continuous mass even when it is turned upside-down, to thereby minimize mixing of the ion exchange beads with the activated charcoal grains.

By avoiding mixing of the ion exchange beads and carbon grains, even though they lie in intimate contact with each other to form an interface 76 without a barrier between them, applicant avoids the extra cost of such a barrier and of handling it.

Figure 4:
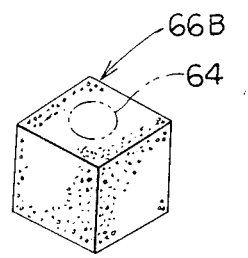
FIG. 4 is a perspective view of the retainer of FIG. 2, shown before insertion in the water filter housing.
Figure 5:
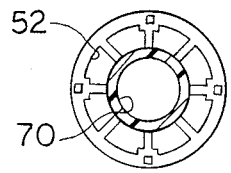
FIG. 5 is a view taken on the line 5—5 of FIG. 2.

The air-passing retainer 66 is formed of a block of resilient open cell foam material such as polyurethane foam. Applicant finds that the retainer can be installed merely by using a relatively large block and cramming it into the air passage. FIG. 4 shows the retainer at 66B, and shows its dimension relative to the air passage at 64 into which it is installed. This mode of installation is of very low cost.

Thus, the invention provides a water filter for use in a water purifier, which includes columns of ion exchange material and of activated charcoal placed so water flows first through the ion exchange material and then through the carbon material. Although both materials have low cohesive strength, mixing of the materials is avoided during transport, even though the mass of ion exchange material lies directly on the mass of activated charcoal material, and even though there is an air space above the mass of ion exchange material. This is accomplished by making the free air space above the ion exchange material, of a smaller volume, and preferably of less than half the volume of the mass of ion exchange material. Also, applicant provides a downwardly-facing ledge at the top of the ion exchange material, which helps avoid sliding down of the periphery of the mass of ion exchange material. A retainer that allows air to pass up through the air passage while limiting movement of the ion exchange material out of the housing when the water filter is turned upside-down, is formed from a block (of any shape in its undeformed state) of greater width than the air passage, and which is resiliently compressed in the air passage so it is held in place by friction due to its tendency to expand.

The novel features of the invention are set forth with particularity in the appended claims. The invention will be best understood from the following description when read in conjunction with the accompanying drawings.

We claim:

1. A water filter comprising:
   a housing having an elongated vertically-extending chamber with a lower end having a water outlet, an upper end having an air outlet, and a middle part having a water inlet;
   a mass of activated charcoal grains in said chamber lying below said water inlet;
   a mass of ion exchange material in said chamber lying on said charcoal grains but generally below said water inlet, said ion exchange material including a multiplicity of resin beads;
   an air-passing retainer lying in said chamber above said ion exchange material and above said water inlet, but below said air outlet;
   said ion exchange material lying directly on said mass of activated charcoal grains, and said retainer being spaced above said ion exchange material, with the volume of the portion of said chamber lying between said retainer and said mass of ion exchange material being less than the volume of said mass of ion exchange material.

2. The water filter described in claim 1 wherein:

said retainer comprises a block of resilient open cell foam material lying in a compressed state in said chamber.

3. The water filter described in claim 1 wherein:

said housing forms a downwardly-facing ledge lying approximately at the top of said mass of ion exchange material, whereby to minimize downward flow of said ion exchange material when said housing is tilted far from an upright orientation.

4. The water filter described in claim 3 wherein:

the portion of said chamber lying above said mass of ion exchange material has a smaller diameter than the portion of said chamber containing said mass of ion exchange material, and said ledge is annular and lies at the intersection of said portions of said chamber.

* * * * *